(No Model.)

M. KLEMA.
POTATO DIGGER.

No. 527,863. Patented Oct. 23, 1894.

Witnesses.
O. H. Keeney.
Agnes V. Faust.

Inventor.
Martin Klema,
By Benedict & Morsell
Attorneys.

UNITED STATES PATENT OFFICE.

MARTIN KLEMA, OF CALEDONIA, WISCONSIN.

POTATO-DIGGER.

SPECIFICATION forming part of Letters Patent No. 527,863, dated October 23, 1894.

Application filed November 13, 1893. Serial No. 490,789. (No model.)

*To all whom it may concern:*

Be it known that I, MARTIN KLEMA, of Caledonia, in the county of Racine and State of Wisconsin, have invented a new and useful Improvement in Potato-Diggers, of which the following is a description, reference being had to the accompanying drawings, which are a part of this specification.

My invention has relation to improvements in potato diggers. Its object is to provide a simple implement of the character referred to, having the capability of effectually sifting the earth from the tubers, and depositing the potatoes in a longitudinal line along the ground, with provision, also, if desired, for thrusting or forcing the vines to one side during the travel of the machine.

The invention also incidentally comprehends novel means for adjusting the depth of incision of the plow.

With the above object, and others, in view, the invention consists in the devices and parts, or their equivalents, as hereinafter more fully described and claimed.

Figure 1:
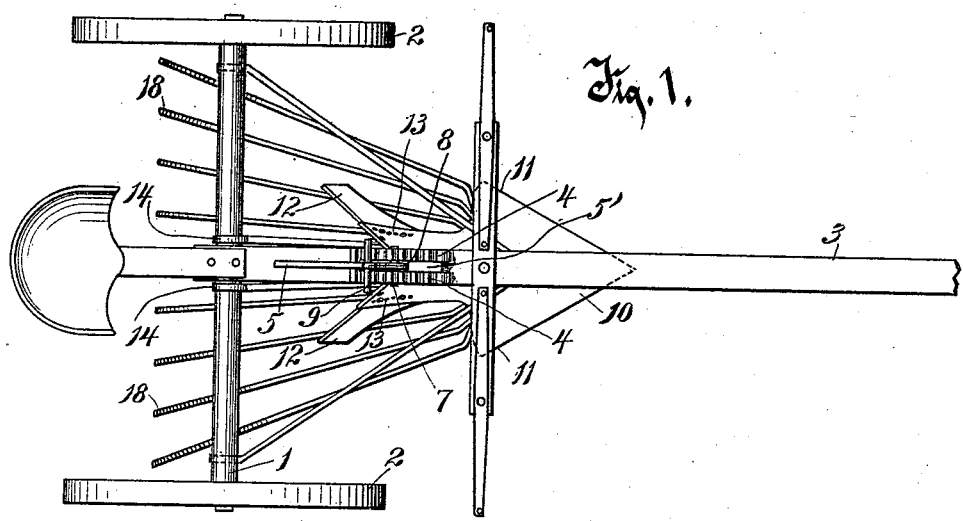
Figure 2:
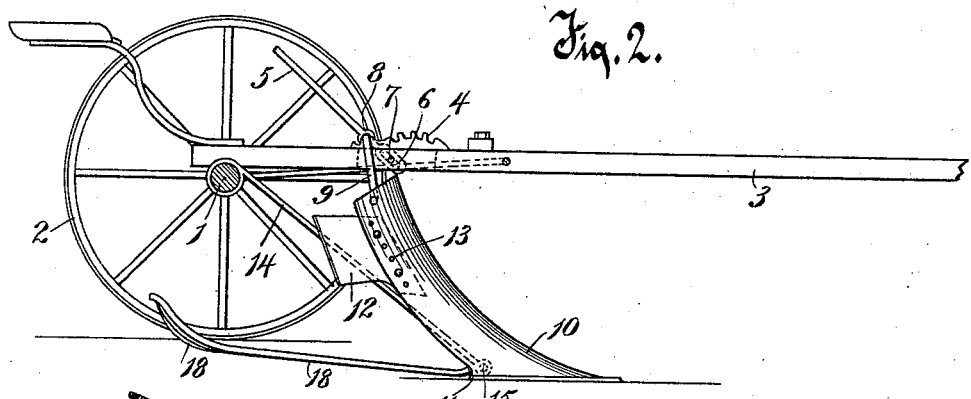
Figure 3:
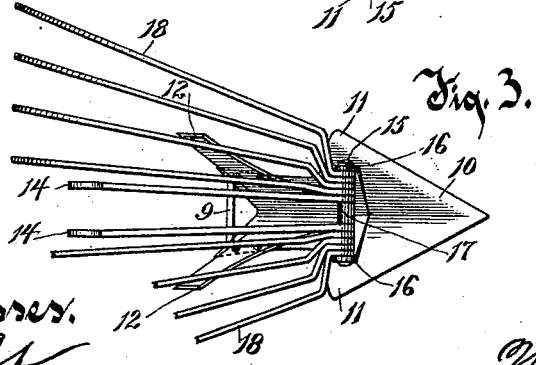

In the accompanying drawings, Figure 1, is a plan view of the complete device. Fig. 2, is a side elevation thereof, and Fig. 3, is an inverted plan view of the plow and the bars constituting the grate.

Like numerals of reference denote like parts throughout the several views.

Referring to the drawings, the numeral 1 indicates the main axle; 2, the driving wheels mounted thereon, and 3, the tongue or thill.
As these several parts are of the usual and well known construction, they do not require any specific description. Secured to the top of the thill or tongue is a segmentally toothed rack, preferably consisting of two plates 4, 4.
The lower end of an operating lever 5 passes between the plates 4, 4, and enters a slot 5' in the tongue or thill, said lower end of the lever being provided with an elongated slot 6, through which a transverse pin 7 passes.
The operating lever is provided medially with an eye 8, through which passes the horizontal portion of a U-shaped hanger 9. The lower ends of the vertical arms of this hanger engage the upper end of a plow 10. The neck or shank of this plow is of considerably less width than the plow point, so that at the point of merging of the two, laterally projecting angles or corners 11, 11, are formed.

The numerals 12, 12 indicate wings secured to opposite sides of the shank or neck of the plow, near the upper end thereof. These wings are provided with apertures which are adapted to register with a series of apertures 13 in the plow shank, whereby, by the use of pins passing through the registering apertures, the vertical adjustment of the wings is provided for.

Secured at their upper ends to the axle 2, and extending down at an obliquity are parallel rods 14, 14, having rigid with their lower ends a transverse pin 15, the ends of which pass through eyed lugs 16, 16, depending from the under side of the plow point, whereby the plow is adapted to be turned upon the transverse pin. On the pin, between the two rods 14, 14, is arranged a washer 17.

Pivoted at their inner ends on the transverse pin 15 are a series of bars 18, forming a grate, which is adapted to drag along the ground, when the implement is in operation. These bars extend rearward from the transverse pin at lateral obliquities, the outer bars having the greatest declination, which declination gradually diminishes with each successive inner rod. The eyes at the inner ends of the two innermost rods 18, through which the pin 15 passes, lie next to the rods 14, 14, and as the washer 17 separates the two last named rods, a considerable space is necessarily left between the two innermost rods 18. The outer ends of all the several rods constituting the grate are curved upward, as clearly shown in the drawings, the degree of curvature of each successive bar gradually increasing toward the central space, and the length of curvature gradually diminishing toward said central space.

When the machine is in operation, the plow point enters a ridge or hill, and lifts the tubers and earth over the laterally projecting corners or angles 11, 11, and deposits them on to the grate to the rear plow. This grate sifts the earth from among the tubers, and by reason of the peculiar end curvatures of the rods composing the grate, the potatoes are thrown inward, and drop through the central space of the grate on to the surface of the ground, whereby, when the digging is completed, the potatoes will be left lying in a longitudinal line.

From the fact that the bars composing the grate are free to turn at their inner ends on the transverse pin 15, said bars drag along the ground yieldingly whereby they are enabled to give to any obstructions that may be encountered.

The wings 12, 12 secured near the upper end of the plow shank, serve to throw the vines, which rise to some little height, off to one side. These wings are made vertically adjustable so that they may be regulated to the height of the vines, and also regulated with the adjustment of the depth of incision of the plow point. This latter adjustment, viz., the regulation of the depth of incision of the plow point, is obtained by means of the operating lever 5, which when manipulated carries the U-shaped hanger forward or rearward, and thereby turns the plow upon its pivot and throws the point thereof so as to make a deep or shallow incision, as desired. When the operating lever is thrown forward, the plow point will, of course, cut deeper into the ground, and when thrown rearward, vice versa. The travel of the U-shaped hangers over the segmentally racked plates is permitted by reason of the provision of the elongated slot in the end of the operating lever through which the transverse pin 7 passes. Of course, when the proper adjustment is obtained, the plow is held in its adjusted position by permitting the horizontal portion of the U-shaped hanger to fall in between the teeth of the segmentally toothed plates.

Having thus described my invention, what I claim, and desire to secure by Letters Patent, is—

1. In a potato digger, the combination, of the frame of the machine, the tongue or thill thereof provided with a slot, segmentally toothed plates upon opposite sides of the slot, a transverse pin intersecting the slot of the tongue, an operating lever passing between the segmentally toothed plates and entering the slot, the lower end of said lever provided with an elongated slot through which the pin passes, a pivoted plow, and a U-shaped hanger, having its horizontal portion engaging medially the lever, and adapted to be operated thereby, and its ends engaging the upper portion of the plow substantially as set forth.

2. In a potato digger, the combination of the frame of the machine, a plow, an arm or arms extending down from the axle of the machine and provided with a transverse pin, the ends of which are journaled in bearings beneath the plow, whereby said plow is free to turn upon the pin as a pivot, and a series of bars forming a grate, the inner ends of said bars also turning upon the pin, substantially as set forth.

3. In a potato digger, the combination of the frame of the machine, a plow, arms extending from the axle of the machine, a transverse pin beneath the plow, and secured to the lower ends of the arms, said arms engaging the pin medially and at distances apart, and a series of bars constituting a grate, said bars having their inner ends engaging the pin upon the outer sides of the arms, whereby a central space is formed in the grate bar, substantially as set forth.

In testimony whereof I affix my signature in presence of two witnesses.

MARTIN KLEMA.

Witnesses:
 FRANK SMERCHEK,
 JOHN PLEVKA.